Patented July 1, 1941

2,247,899

UNITED STATES PATENT OFFICE 2,247,899

CONDENSATION PRODUCT OF PHTHALON-IMIDES AND PHENOLS

Christian Wiegand, Wuppertal-Elberfeld, Germany, assignor to Winthrop Chemical Company, Inc., New York, N. Y., a corporation of New York No Drawing. Application March 6, 1940, Serial No. 322,533. In Germany March 31, 1939

14 Claims. (Cl. 260—289)

This invention relates to condensation products which are useful for therapeutic and technical purposes.

In accordance with the present invention 1.3.4-triketo-1.2.3.4-tetrahydro-isoquinoline or its substitution products may be condensed with phenols or substituted phenols or with the derivatives of such phenols, that is acyl and ether derivatives, in the presence of dehydrating agents. In this condensation 1 molecule of the said isoquinoline compound reacts with 2 molecules of the phenol while splitting off 1 molecule of water. The condensation, therefore, is performed while using at least 2 mols of phenol upon 1 mol of the isoquinoline compound. An excess of the phenol used in the reaction advantageously is added as solvent or diluent. Also other suitable media, such as glacial acetic acid and acetic anhydride may be used as solvents or diluents. When using acetic anhydride acetyl derivatives of the condensation products are primarily obtained. Concentrated sulfuric acid is preferred as the dehydrating agent, but also other dehydrating agents, such as alkali metal bisulfate, zinc chloride, borosulfuric acid, phosphorus oxychloride, phosphorus pentoxide and the like may be used.

When subjecting the condensation products other than those obtained in acetic anhydride to the usual acylation processes, so many acyl radicals are taken up by the condensation product as correspond to the number of hydroxyl groups which have entered into the condensation product with the phenol radicals; the phenolic hydroxyl groups, therefore, do not take part in the condensation reaction; this also results from the utility of the derivatives of the phenols for the condensation. Such a derivative group may subsequently be split off to the phenol group in the usual manner. The presence of phenolic hydroxyl groups further results from the solubility of the condensation products in alkali metal hydroxide solutions.

The condensation products probably have the formulae of 1.3-diketo-4-bis-hydroxyphenyl-1.2.3.4-tetrahydro-isoquinolines.

The condensation products are obtained in colorless crystals. Due to their purgative action and their good compatibility they are intended to be used particularly as therapeutics, but they may also be used as starting-materials in the manufacture of dyestuffs, mothproofing agents, etc.

The invention is illustrated by the following examples without, however, being restricted thereto:

Example 1

A solution of 5 grams of 1.3.4-triketo-1.2.3.4-tetrahydro-isoquinoline in 25 grams of phenol is treated drop by drop while stirring at about 60° C. with 1 ccm. of concentrated sulfuric acid. After all sulfuric acid has been added, the mixture is stored for some time, the excess phenol is blown off with steam and the remaining mass which has solidified to crystals, is sucked off. After recrystallization from the about 15 fold quantity of 66% aqueous methanol the diketo-bis-(para-hydroxyphenyl)-tetrahydro-isoquinoline melting at 273–275° C. is obtained in a good yield.

The compound may be converted in a mixture of benzene, acetic anhydride and concentrated sulfuric acid in the usual manner into its diacetate melting at 243–245° C. (when recrystallized from alcohol).

Example 2

A solution of 5 grams of 1.3.4-triketo-tetrahydro-isoquinoline in 25 grams of 2-cresol is treated after heating to 100° C. with 1 ccm. of concentrated sulfuric acid. After working up the mixture according to example 1 the diketo-bis-(4-hydroxy-3-methylphenyl)-tetrahydro-isoquinoline melting at 260–262° C. is obtained in a good yield.

In a similar manner also the 3-cresol has been subjected to the condensation.

Example 3

5 grams of 1.3.4-triketo-1.2.3.4-tetrahydro-isoquinoline are heated with 25 grams of 2-chlorophenol to 70–75° C. The mixture is gradually treated with 1 ccm. of concentrated sulfuric acid. On working up the mixture according to Example 1, the diketo-bis-(4-hydroxy-3-chlorophenyl)-tetrahydro-isoquinoline melting at 271–272° C. is obtained after recrystallization from the 20 fold quantity of 40% aqueous methanol.

In a similar manner 5 grams of the triketo-tetrahydro-isoquinoline may be condensed with 25 grams of guajacol at 115° C. with the addition of 1 ccm. of concentrated sulfuric acid. The condensation may also be performed with anisol.

I claim:

1. A condensation product of one mol of 1.3.4-triketo-1.2.3.4-tetrahydro-isoquinoline with two mols of a phenol, having probably the formula of a 1.3-diketo-4-bis-hydroxyphenyl-1.2.3.4-tetrahydro-isoquinoline.

2. A condensation product of one mol of 1.3.4-triketo-1.2.3.4-tetrahydro-isoquinoline with two mols of phenol having probably the formula of 1.3-diketo-4-bis-(para-hydroxyphenyl)-1.2.3.4-tetrahydro-isoquinoline.

3. The process which comprises reacting one mol of 1.3.4-triketo-1.2.3.4-tetrahydro-isoquinoline with two mols of a phenol with the addition of a dehydrating agent.

4. The process which comprises reacting one mol of 1.3.4-triketo-1.2.3.4-tetrahydro-isoquinoline with two mols of phenol in the presence of a dehydrating agent.

5. The process which comprises reacting one mol of 1.3.4-triketo-1.2.3.4-tetrahydro-isoquinoline with two mols of a phenol with the addition of concentrated sulfuric acid.

6. The process which comprises reacting one mol of 1.3.4-triketo-1.2.3.4-tetrahydro-isoquinoline with two mols of phenol with the addition of concentrated sulfuric acid.

7. The process which comprises reacting one mol of 1.3.4.-triketo-1.2.3.4.-tetrahydro-isoquinoline with two mols of a phenol with the addition of a dehydrating agent and in the presence of a diluent.

8. The process which comprises reacting one mol of 1.3.4.-triketo-1.2.3.4.-tetrahydro-isoquinoline with two mols of phenol with the addition of a dehydrating agent and in the presence of a diluent.

9. The process which comprises reacting one mol of 1.3.4.-triketo-1.2.3.4.-tetrahydro-isoquinoline with two mols of a phenol with the addition of concentrated sulfuric acid and in the presence of a diluent.

10. The process which comprises reacting one mol of 1.3.4.-triketo-1.2.3.4.-tetrahydro-isoquinoline with two mols of phenol with the addition of concentrated sulfuric acid and in the presence of a diluent.

11. The process which comprises reacting one mol of 1.3.4.-triketo-1.2.3.4.-tetrahydro-isoquinoline with two mols of a phenol with the addition of a dehydrating agent while using an excess of the reacting phenol as diluent.

12. The process which comprises reacting one mol of 1.3.4.-triketo-1.2.3.4.-tetrahydro-isoquinoline with two mols of phenol in the presence of a dehydrating agent while using an excess of phenol as diluent.

13. The process which comprises reacting one mol of 1.3.4.-triketo-1.2.3.4.-tetrahydro-isoquinoline with two mols of a phenol with the addition of concentrated sulfuric acid while using an excess of the reacting phenol as diluent.

14. The process which comprises reacting one mol of 1.3.4.-triketo-1.2.3.4.-tetrahydro-isoquinoline with two mols of phenol with the addition of concentrated sulfuric acid while using an excess of phenol as diluent.

CHRISTIAN WIEGAND.